Oct. 30, 1951     F. B. BERGER ET AL     2,572,975

RADIO ANTENNA SCANNING AND AZIMUTH MARKING MEANS

Filed Aug. 20, 1945     3 Sheets-Sheet 1

INVENTORS
FRANCE B. BERGER
FREDERICK F. SLACK
BY
William D. Hall
ATTORNEY

Oct. 30, 1951     F. B. BERGER ET AL     2,572,975
RADIO ANTENNA SCANNING AND AZIMUTH MARKING MEANS
Filed Aug. 20, 1945     3 Sheets-Sheet 3

*INVENTORS*
FRANCE B. BERGER
FREDERICK F. SLACK
BY
*William D. Hall.*
*ATTORNEY*

Patented Oct. 30, 1951

UNITED STATES PATENT OFFICE 2,572,975

2,572,975

RADIO ANTENNA SCANNING AND AZIMUTH MARKING MEANS

France B. Berger, Watertown, and Frederick F. Slack, Medford, Mass., assignors, by mesne assignments, to the United States of America as represented by the Secretary of War Application August 20, 1945, Serial No. 611,658

11 Claims. (Cl. 343—113)

This invention relates generally to electrical apparatus and more particularly to an azimuth mark generator and sector scan control circuit for a radio object detection apparatus.

In one type of radio object detection apparatus, a cathode ray tube indicator is used, in which the electron beam is caused to describe a radial path starting at a center (which may or may not be the center of the screen) at the instant of transmission of a pulse of radio frequency energy and moving along a radius in the interval between pulses. The radial sweep is caused to rotate about the center in a manner corresponding to the rotation of the beam of electromagnetic energy when the antenna is turned. The electron beam intensity is kept below the threshold of visibility, being raised above the threshold by the returning echoes from objects being detected. The objects detected are thus presented as bright spots distributed on the cathode ray tube in such a way that their angular positions with reference to an arbitrary radius are measures of the azimuths of the objects, and their distances from the center are measures of the ranges of the objects. Such an indicator is referred to as a plan position indicator, abbreviated PPI.

In a radio object detection apparatus employing PPI presentation, it may be desirable to intensify the electron beam momentarily once during each rotation of the sweep in such a way as to cause a bright trace to appear on the cathode ray tube screen passing through the central point of the pattern and being adjustable in azimuth so as to pass through the trace representing a selected object. It is an object of this invention to provide means for producing said trace, referred to hereinafter as an azimuth mark.

In a radio object detection apparatus employing PPI presentation, it may be desirable to cause the antenna of said equipment to oscillate through a restricted angle while aimed generally in the direction of a selected object, so that the PPI presents only a corresponding sector of the total ground area within range of the apparatus, said sector being rotatable in azimuth. It is a further object of this invention to provide means for producing this mode of operation, referred to hereinafter as sector scanning, while producing an azimuth mark which rotates with and maintains a fixed position within said rotatable scanned sector.

In a radio object detection apparatus employing PPI presentation with sector scanning and an azimuth mark, it may be desirable to cause the sector scanned to remain centered about a reference direction while permitting the azimuth mark to be shifted within the sector. It is a still further object of this invention to provide means for producing this mode of operation.

Other objects, features, and advantages of this invention will suggest themselves to those skilled in the art and will become apparent from the following description of the invention taken in connection with the accompanying drawing in which.

Figure 1:
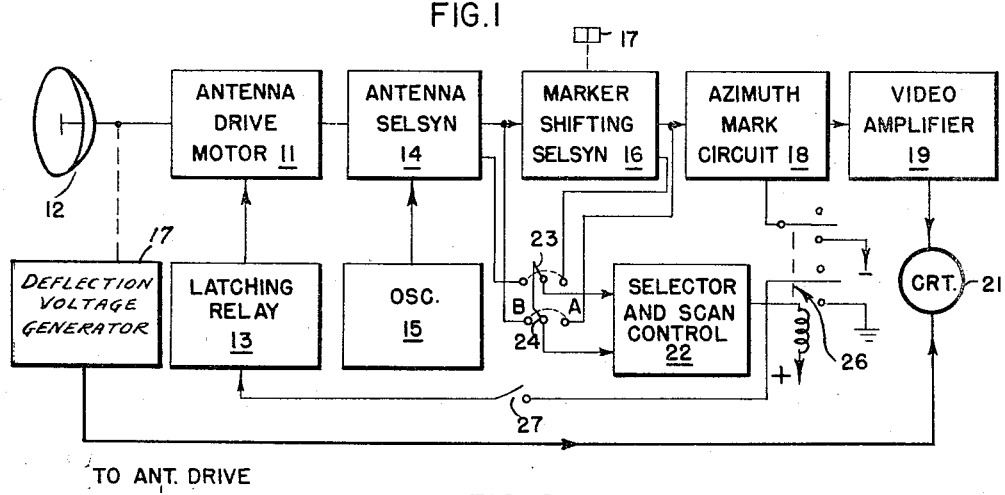
Fig. 1 is a block diagram showing the relationship of this invention to other equipment with which it may be used.

Referring now more particularly to Fig. 1 for a description of a system in which this invention may be used, antenna drive motor 11 drives antenna 12, and is controlled by latching relay 13. Motor 11 also drives antenna "Selsyn" 14 at the rate of one revolution per antenna revolution. The rotor winding of "Selsyn" 14 is connected to oscillator 15 which excites it at a frequency of the order of 5 kilocycles, and the stator windings are connected to the stator windings of marker shifting "Selsyn" 16. The rotor of "Selsyn" 16 is adapted to be driven by knob 17 when adjustment of the azimuth mark is required, or may optionally be driven by other equipment, not shown, for computing the azimuth of a selected ground object. An output voltage from the rotor of "Selsyn" 16 is applied to azimuth mark circuit 18, which will be described in detail subsequently. Azimuth mark circuit 18 supplies azimuth mark pulses to video amplifier 19, and thence to cathode ray tube 21, which are components of the radio object detection apparatus. Deflection voltage generator 17 is mechanically coupled to the drive of antenna 12 and provides voltages for deflecting the cathode ray of cathode ray tube 21 in synchronism with the azimuth scan of antenna 12.

Switches 23 and 24 are adapted to connect selector and scan control circuit 22 either to antenna "Selsyn" 14 or to marker shifting "Selsyn" 16. Selector and scan control circuit 22 is connected to, and produces an output voltage for the operation of, relay 26, in a manner to be described.

Relay 26 is adapted to render azimuth mark circuit 18 inoperative in a manner and under certain circumstances to be described, and to cause operation of latching relay 13 when sector scan operation is required. Latching relay 13 may be of the type well known to those skilled in the art, having two possible positions when deenergized, changing from one position to the other when one terminal is momentarily grounded. Alternatively, relay 13 may be of the rotary stepping type, which advances one step each time the operating coil is energized, to reverse motor 11. Switch 27 is connected between relay 26 and latching relay 13 in such a way as to prevent reversal of drive motor 11, when 360° scanning is required.

Figure 2:
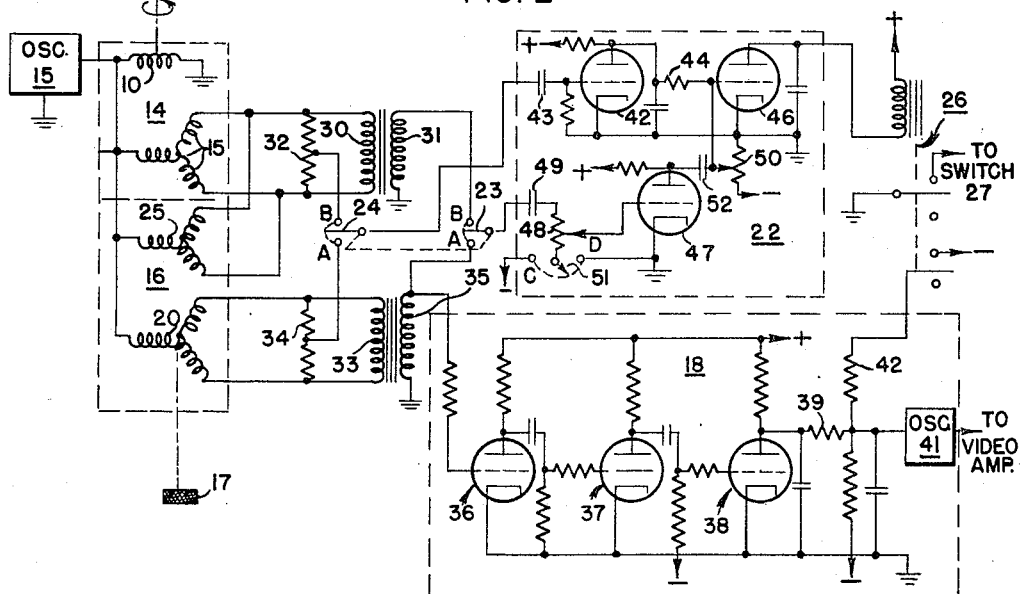
Fig. 2 is a schematic wiring diagram of the preferred embodiment of this invention.
Figure 3:
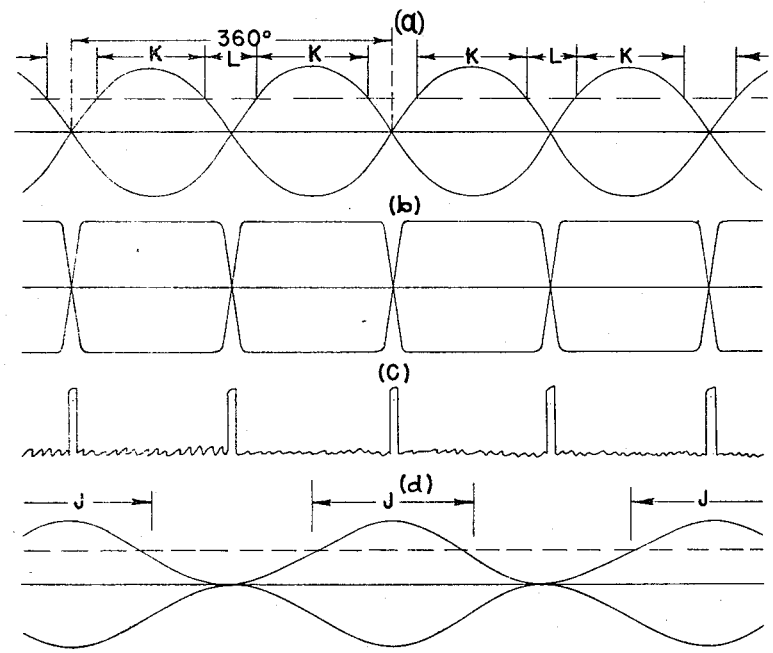
Fig. 3 is a series of waveforms used in explaining the operation of this invention.
Figure 3:
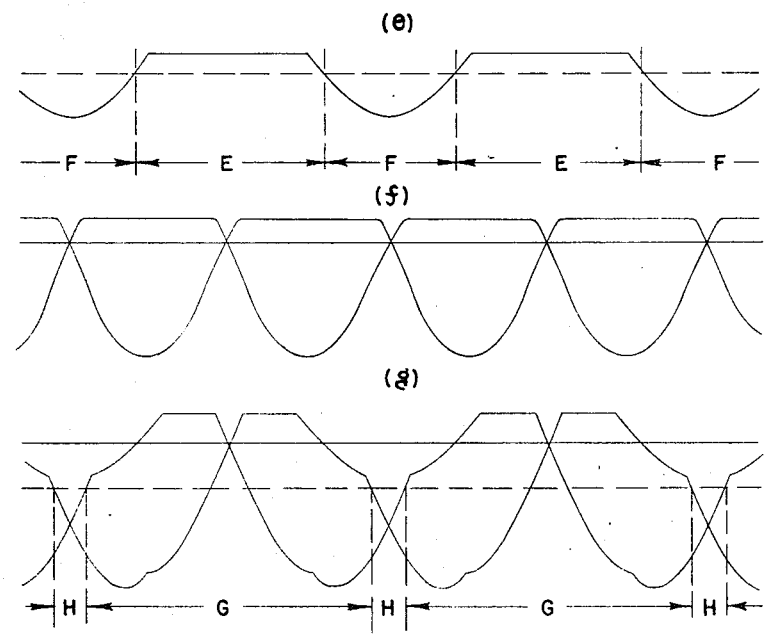

Reference is now made more particularly to Figs. 2 and 3 for a detailed description of this invention. "Selsyn" 14 has a rotor with a single winding 10, and a stator having three windings 15, which are 120° apart in space phase and connected in either the wye or the delta pattern, the wye connection being shown. Rotor winding 10 is connected to and excited by oscillator 15, so that voltages whose amplitudes depend upon the angular position of antenna 12 are induced in stator windings 15, as will be obvious to those skilled in the art. These stator voltage amplitudes vary in a sinusoidal manner with the antenna angle.

In "Selsyn" 16 both the rotor 20, and the stator 25 have three windings 120° apart in space phase and connected in either the wye or delta pattern, the wye connection being shown here. Stator windings 25 are connected to stator windings 15 of "Selsyn" 14, so that the voltage induced in rotor windings 20 of "Selsyn" 16 have amplitudes determined both by the angular position of antenna 12 and by the angular position of rotor 20 of "Selsyn" 16 as set by knob 17.

Two of the stator terminals of "Selsyn" 14 are also connected to transformer primary 30, across which resistor 32 is bridged. Similarly, transformer primary 33 and resistor 34 are connected across two of the rotor terminals of "Selsyn" 16. The remaining terminals of the rotor of "Selsyn" 16 and of the stator of "Selsyn" 14 are connected together and to oscillator 15, so that the voltage at the center tap of resistor 32 consists of the sum of a component varying in amplitude in a sinusoidal manner with antenna angle, and a component of constant amplitude. Similarly, the voltage at the center tap of resistor 34 is the sum of a component of constant amplitude and a component varying in amplitude in a sinusoidal manner with both the antenna angular position and the angular setting of the rotor of "Selsyn" 16.

Transformer secondary winding 35 is connected to and furnishes the input voltage for azimuth mark circuit 18. The envelope of the alternating voltage waveform applied to azimuth mark circuit 18 is shown in Fig. 3a, all waveforms in Fig. 3 being drawn to represent the condition in which switch 27 is open so that antenna 12 rotates continuously and uniformly, and knob 17 remains fixed. Tubes 36 and 37 are connected as overdriven amplifiers employing grid clipping, an arrangement which is well known in the art, the result of the two successive clipping and amplifying operations being shown in Fig. 3b. Tube 38 is connected to perform an additional clipping operation and to act as a plate detector so that, as will be obvious to those skilled in the art, the waveform of voltage at the plate of tube 38 is as represented in Fig. 3c.

The plate of tube 38 is connected through resistor 39 to oscillator 41 so that the latter is caused to oscillate during the positive pulses of Fig. 3c, provided that relay 26 is energized. When relay 26 is not energized, an additional negative bias is connected through resistor 42 to oscillator 41 so that the latter will not be caused to oscillate by the positive pulses from tube 38. Oscillator 41 may be any one of many types well known in the art which will oscillate at a frequency of the order of one megacycle per second and which may be rendered inoperative by the application of a negative bias as described. Oscillator 41 is provided in order to produce an azimuth mark signal consisting of a short burst of oscillations which will pass through video amplifier 19. Fig. 3c may be regarded as the upper envelope of the output waveform from oscillator 41.

It will be obvious to those skilled in the art that the azimuth mark produced on the screen of cathode ray tube 21 will be coincident in time with the nulls in the envelope of the voltage applied to azimuth mark circuit 18. It will also be obvious that the incidence of said nulls may be shifted with respect to the azimuthal position of antenna 12 by means of knob 17, so that the azimuth mark may be rotated to any desired azimuthal position on the screen. It will be still further obvious that if antenna 12 is rotated while knob 17 is not moved, two nulls will appear in the voltage waveform applied to azimuth mark circuit 18 for each revolution of antenna 12, so that two azimuth marks will be produced at opposite azimuths. Since one of these marks evidently points directly away from the selected object, it is removed by a means to be described.

As previously mentioned, the voltage between the center tap of resistor 34 and ground consists of two components one of which varies in amplitude in a sinusoidal manner with antenna angle and with the setting of knob 17, and the other of which is constant in amplitude. It will be obvious to those skilled in the art that the maxima in amplitude of the variable amplitude component of voltage will coincide in time with alternate nulls in the voltage applied to azimuth mark circuit 18, hence also with the azimuth mark pulses. The envelope of the voltage waveform at the center tap of resistor 34 is therefore as shown in Fig. 3d.

Selector and scan control circuit 22 comprises two channels for operating relay 26 to produce sector scan operation and to eliminate the undesired azimuth marks mentioned above. A first channel comprises tube 42 which is connected as a plate detector, the operation of which will be obvious to those skilled in the art. The grid of tube 42 is connected through condenser 43 to switch 24 and the plate of tube 42 is connected through resistor 44 to the grid of tube 46. The plate of tube 46 is connected through the operating coil of relay 26 to a positive source of voltage.

A second channel of selector and scan control circuit 22 comprises tube 47. The grid of tube 47 is connected through potentiometer 48 and condenser 49 to switch 23, the lower end of potentiometer 48 being connected to switch 51. Switch 51 is adapted to connect potentiometer 48 to a negative source of voltage or to ground in positions C and D respectively. Tube 47 is adapted to operate as an overdriven amplifier, its plate being connected through condenser 52 to the grid of tube 46.

The voltage waveform impressed on the grid of tube 42 with switch 24 in position A is that previously described with reference to Fig. 3d. The rectification produced by tube 42 results in a waveform similar to that shown in Fig. 3e at the grid of tube 46, provided that switch 51 is in position C biasing tube 47 permanently below plate current cutoff. Relay 26 is so adjusted as to be closed during the intervals when the potential on the grid of tube 46 exceeds a value represented by the dashed line in Fig. 3e. Relay 26 will therefore be in the closed position in the intervals E of Fig. 3e, and correspondingly open in the intervals F. As a result, a negative voltage is applied to oscillator 41 as previously described during the intervals E, eliminating the azimuth marks occurring within these intervals. If now switch 27 of Fig. 1 be closed so that relay 26 can connect latching relay 13 to ground, it will be obvious to those skilled in the art that antenna 12 will be caused to oscillate through one of the intervals F in Fig. 3e, since relay 26 closes each time one of the vertical dashed lines is approached from within an interval F. The width of the intervals F, and therefore the width of the sector scanned may be controlled within relatively narrow limits by adjustment of the grid bias on tube 46 by means of potentiometer 50.

Figure 4:
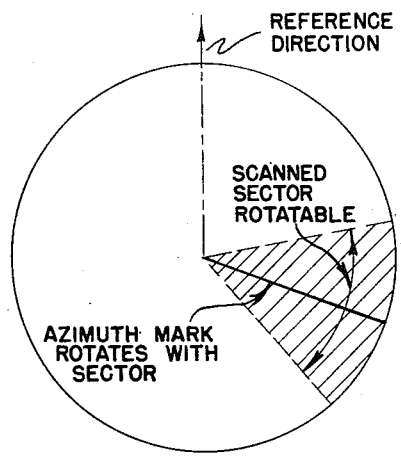
Figs. 4 and 5 are drawings of the screen of the cathode ray tube indicator illustrating two types of operation of this invention.

The mode of operation described above for sector scan control is satisfactory only as long as the grid voltage waveform for tube 46 as shown in Fig. 3e is sufficiently steep, at the operating level for relay 26, to provide positive operation. If the negative grid bias applied to tube 46 should be made very small in an attempt to produce a very narrow sector, it will be observed that the operating level for relay 26 will intersect the curve of Fig. 3e at points where the latter is very flat. More positive operation when scanning a narrow sector is obtained by means of the second channel of selector and scan control circuit 22. The envelope of the voltlage applied to the grid of tube 47 during continuous antenna rotation with switch 23 in position A and switch 51 in position D is that shown in Fig. 3a. As previously mentioned, tube 47 acts as an overdriven amplifier in that its grid may be driven below plate current cutoff so that the envelope of the waveform resulting at the plate of tube 47 is that represented in Fig. 3f. This voltage is added to that represented in Fig. 3e to produce the waveform of Fig. 3g at the grid of tube 46. The adjustment of relay 26 is such that it is closed during those intervals when the grid voltage of tube 46 exceeds the level of the dashed line of Fig. 3g. Thus relay 26 is closed in the intervals G and opened in the intervals H of Fig. 3g. The type of operation thus obtained with switches 23 and 24 in their respective positions A—A is illustrated in Fig. 4 which shows the screen of cathode ray tube 21 with a rotatable scanned sector and an azimuth mark which rotates with the sector.

Figure 5:
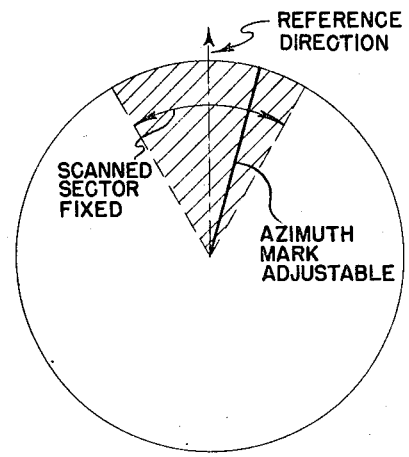

When switches 23 and 24 are thrown to their respective positions B—B, the voltages applied to selector and scan control circuit 22 are obtained from stator windings 15 of "Selsyn" 14. These voltages have the same envelopes as those described with reference to "Selsyn" 16, but are not adjustable in phase by knob 17. It will be obvious to those skilled in the art without further discussion that the scan sector defined by these voltages will not be adjustable in azimuth. The position of the sector may be initially adjusted to the reference direction by uncoupling rotor 10 of "Selsyn" 14 from the antenna drive. The azimuth mark is still produced from the output of "Selsyn" 16, however, so that the said azimuth mark may be adjusted independently by means of knob 17 within the sector scanned. The type of operation obtained with switches 23 and 24 in their respective positions B—B is illustrated in Fig. 5, showing a scanned sector which is fixed in position and an azimuth mark adjustable within the sector.

Figure 6:
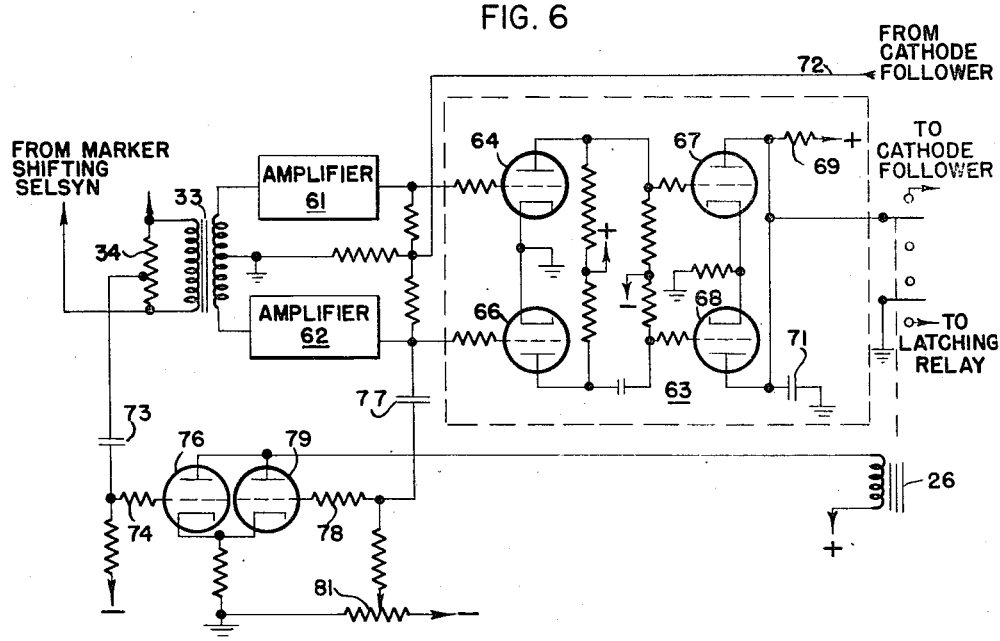
Fig. 6 is a schematic wiring diagram of a modification of a portion of this invention.

Referring now more particularly to Fig. 6 for a description of a modification of a portion of this invention, the secondary of transformer 33 is grounded at the center instead of at one end as previously. The secondary terminals of transformer 33 are connected to amplifiers 61 and 62 which are connected as conventional class A amplifiers, the details of connection and operation of such amplifiers being well known to those skilled in the art. Amplifiers 61 and 62 are connected to azimuth mark circuit 63, their output waveforms having envelopes similar to that shown in Fig. 3a.

The center tap of resistor 34 is connected through condenser 73 and resistor 74 to the grid of tube 76. As previously described, the envelope of the voltage waveform at the center tap of resistor 34 is represented by Fig. 3d. Tube 76 is biased considerably below plate current cutoff, so that it can be rendered conducting by the input waveform only when the envelope of Fig. 3d rises above the level of the dashed line. The plate of tube 76 is connected through the operating coil of relay 26 to a positive source of potential, so that relay 26 is closed in the intervals J of Fig. 3d.

The output from amplifier 62 is connected through condenser 77 and resistor 78 to the grid of tube 79 which is biased slightly below cutoff, the conducting intervals for tube 79 being those marked with the letter K in Fig. 3a. Since plate and cathode of tube 79 are connected respectively to plate and cathode of tube 76, relay 26 is required to be closed in the intervals K as well as the intervals J.

It is observed that the intervals J in Fig. 3d overlap alternate spaces between intervals K in Fig. 3a, so that relay 26 is permitted to be open only in the intervals marked L in Fig. 3a, and that only the azimuth mark pulses occurring within these intervals are transmitted to cathode ray tube indicator 21. It is further observed that the intervals L define the sector scanned and that this sector is accurately controlled because of the steepness of the envelope of Fig. 3a at the points where relay 26 opens and closes. The width of the sector scanned is adjusted by variation of potentiometer 81, which is adapted to control the grid bias applied to tube 79.

In this modification, no provision is made for holding the sector scanned at a fixed azimuth while rotating the azimuth mark within the sector.

While there has been described what is at present considered to be the preferred embodiment of this invention, it will be obvious to those skilled in the art that various changes and modifications may be made therein without departing from the scope of the invention as set forth in the appended claims.

The invention claimed is:

1. In a radio object detection apparatus including a rotatable antenna, means for producing a first alternating voltage the amplitude of which is proportional to the sine of the angular position of said antenna with respect to a reference direction, means including said first alternating voltage to cause said antenna to oscillate through a small angle centered about that angular position of said antenna which corresponds to alternate nulls of said first alternating voltage, means for producing a second alternating voltage of varying amplitude the amplitude nulls of which are shiftable in time with respect to the nulls of said first alternating voltage, cathode ray indicating means, means for deflecting the cathode ray of said indicating means in accordance with the angular position of said antenna, means including said second alternating voltage for producing on said indicating means a mark moving in synchronism with alternate nulls of said second alternating voltage.

2. In a radio object detection apparatus including an antenna, means for rotating said antenna, a cathode ray indicator, and means for deflecting the cathode ray of said indicator in accordance with the angular position of said antenna, a circuit for producing a radial marker on said indicator, said circuit comprising first means for producing a first alternating voltage the amplitude of which is proportional to the sine of the angular position of said antenna with respect to a reference direction, second means, including phase shifting means, coupled to said first means for deriving a second alternating voltage shifted in time with respect to said first alternating voltage, third means coupled to said second means for producing pulses coincident in time with the nulls of said second alternating voltage, and fourth means responsive only to pulses coincident with alternate nulls of said second alternating voltage for changing the intensity of the cathode ray of said indicator to produce a marker angularly displaced from said reference direction by an amount determined by the phase shift between said second alternating voltage and said first alternating voltage.

3. The radial marker circuit defined in claim 2, further comprising fifth means for deriving a third alternating voltage 90° out of phase with respect to said first alternating voltage, whereby the amplitude of said third alternating voltage reaches its maximum in a given direction when said antenna is facing in said reference direction, and sixth means coupled between said fifth means and said antenna rotating means for reversing the rotation of said antenna in response to said third alternating voltage reaching a given amplitude other than the maximum in said given direction, whereby said antenna oscillates through a given angle, determined by the value of said given amplitude, on both sides of said reference direction.

4. The radial marker circuit defined in claim 3, wherein said sixth means includes seventh means for distorting said third alternating voltage to increase the rate of change of said third alternating voltage at said given amplitude thereof.

5. The radial marker circuit defined in claim 4, wherein said seventh means includes means for mixing a portion of said first alternating voltage with said third alternating voltage.

6. The radial marker circuit defined in claim 2, further comprising fifth means for deriving a third alternating voltage 90° out of phase with respect to said second alternating voltage, whereby the amplitude of said third alternating voltage reaches its maximum in a given direction coincident in time with the occurrence of said alternate nulls of said second alternating voltage, and sixth means coupled between said fifth means and said antenna rotating means for reversing the rotation of said antenna in response to said third alternating voltage reaching a given amplitude other than the maximum in said given direction, whereby said antenna oscillates through a given angle, determined by the value of said given amplitude, on both sides of the angular position corresponding to that of said radial marker.

7. The radial marker circuit defined in claim 6, wherein said sixth means includes seventh means for distorting said third alternating voltage to increase the rate of change of said third alternating voltage at said given amplitude thereof.

8. The radial marker circuit defined in claim 7, wherein said seventh means includes means for mixing a portion of said second alternating voltage with said third alternating voltage.

9. The radial marker circuit defined in claim 2, further comprising fifth means for deriving a third alternating voltage 90° out of phase with respect to said first alternating voltage, whereby the amplitude of said third alternating voltage reaches its maximum in a given direction when said antenna is facing in said reference direction, sixth means for deriving a fourth alternating voltage 90° out of phase with respect to said second alternating voltage, whereby the amplitude of said fourth alternating voltage reaches its maximum in said given direction coincident in time with the occurrence of said alternate nulls of said second alternating voltage, seventh means coupled to said antenna rotating means for reversing the rotation of said antenna in response to an alternating voltage which is applied thereto reaching a given amplitude other than the maximum in said given direction, and switching means for applying said third alternating voltage to said seventh means in a first position thereof and for applying said fourth alternating voltage to said seventh means in a second position thereof, whereby said antenna oscillates through a given angle, determined by the value of said given amplitude, on both sides of said reference direction when said switching means is in said first position and said antenna oscillates through said given angle on both sides of the angular position corresponding to that of said radial marker when said switching means is in said second position.

10. The radial marker circuit defined in claim 9, wherein said seventh means includes eighth means for distorting the alternating voltage applied thereto to increase the rate of change thereof at said given amplitude thereof.

11. The radial marker circuit defined in claim 10, wherein said eighth means includes second switching means ganged to said first-mentioned switching means, and means for mixing a portion of said first alternating voltage with said third alternating voltage in the first position of said first-mentioned and second switching means and for mixing a portion of said second alternating voltage with said fourth alternating voltage in the second position of said first-mentioned and second switching means.

FRANCE B. BERGER.
FREDERICK F. SLACK.

REFERENCES CITED

The following references are of record in the file of this patent:

UNITED STATES PATENTS

| Number | Name | Date |
|---|---|---|
| 2,272,607 | Higgonet | Feb. 10, 1942 |
| 2,368,448 | Cook | Jan. 30, 1945 |
| 2,388,262 | Ganeayre et al. | Nov. 6, 1945 |
| 2,395,966 | Goldberg | Mar. 5, 1946 |
| 2,409,456 | Tolson | Oct. 15, 1946 |
| 2,412,612 | Godet | Dec. 17, 1946 |
| 2,464,822 | Mallett | Mar. 22, 1949 |
| 2,488,022 | Miller | Nov. 15, 1949 |